United States Patent Office

2,778,727
Patented Jan. 22, 1957

2,778,727

METHOD OF CONCENTRATING METAL VALUES FROM SULFUR SOLUTIONS

Felix Alfred Schaufelberger, Stamford, Conn., assignor to Chemical Construction Corporation, a corporation of Delaware No Drawing. Application August 16, 1954, Serial No. 450,278

5 Claims. (Cl. 75—108)

This invention relates to the concentration of a sulfur-containing solution containing nickel and cobalt values. More specifically, it is concerned with a process for the concentration and recovery of non-ferrous metal values such as those of nickel, cobalt and copper from a leach solution which is saturated with sulfur dioxide and contains sulfur salts of nickel, cobalt, iron, magnesium, manganese, copper and the like.

Concentration and recovery of nickel, cobalt and copper in quantitative yields from a sulfur dioxide saturated leach liquor, particularly one containing 15% or less by weight of nickel, cobalt and copper as well as iron, manganese and magnesium in varying amounts has presented a serious problem in the hydrometallurgical art. It is known that the soluble salts of these metals cannot be conveniently and readily separated from a sulfur dioxide saturated leach solution. One proposed method has been to neutralize the leach solution. However, this method is not entirely satisfactory. Neutralization requires the use of additional chemicals. It further requires a series of elaborate, involved and cumbersome operational steps to effect the recovery of nickel, cobalt and copper values. Another method proposed was to react the leach solution with sodium sulfide or other alkali sulfides. However, the utilization of alkali sulfides materially increased the cost of a concentration and recovery process so as to make this method economically unfeasible.

Accordingly, there has been an increasing demand for an economical process for treating sulfur dioxide saturated leach solutions whereby the metal values therein can be simply separated and processed. A satisfactory process has not as yet been described.

It is, therefore, an object of the present invention to concentrate and recover nickel, cobalt and copper in quantitative yields from sulfur dioxide leach liquors in an economical and simple manner. It is a further object of my invention to convert a sulfur dioxide saturated solution so as to obtain readily separable metal values therefrom.

In general, the objects of this invention are surprisingly simply effected. This is done by treating a sulfur dioxide leach solution containing a small amount of nickel, cobalt and copper values, usually, but not necessarily, some 20 grams per liter (gm./l.) or less, and other metal values with a reducing gas under pressure at an elevated temperature. Unexpectedly, the metal values are readily converted to an easily recoverable state. In this manner also, expensive chemical additives can be eliminated.

According to the present invention, when a sulfur dioxide solution containing usually twenty grams per liter or less of nickel, cobalt and copper in the presence of additional metal values, such as manganese, iron, and magnesium, is heated in an autoclave at an elevated temperature under a positive pressure of a reducing gas, quantitative precipitation of nickel, cobalt and copper sulfides takes place in a relatively short time, usually within one and one-half hours or less. Resultant mixture is cooled, discharged from the pressure vessel and filtered or decanted. Filtrate, which contains mainly soluble ferrous, manganese and magnesium sulfates and sulfites, may be discarded. The precipitate or residue which is recovered comprises a mixture mainly of elemental sulfur, nickel, cobalt and copper sulfides, as well as certain iron sulfur compounds. It may be easily processed so as to recover nickel and cobalt values therefrom by known techniques, as for example, leaching, with or without prior roasting, or by smelting or roasting. These recovery techniques, however, do not form an essential part of the invention and need not be described with particularity.

It is an advantage of the present invention that any source of a sulfur dioxide leach liquor be utilized in the process of the invention. One such source for example is described in my copending application, Serial No. 450,274, filed on even date, now allowed. A garnierite ore is subjected to a sulfur dioxide gas leach under pressure. Leached solids are filtered out and the filtrate heated. A major portion of magnesium as magnesium sulfite precipitates and is removed by filtration. The remaining leach liquor can then be concentrated in accordance with the process of the invention. Another source of $SO_2$- leach liquor suitable for processing according to the present process is obtained from leaches of low grade nickel-bearing ores with mineral acids, such as sulfuric and hydrochloric. Solution thus obtained is then saturated with sulfur dioxide gas and the latter sulfur dioxide saturate solution is processed herein.

Any reducing gas can be used in the process of my invention. Illustrative gases are hydrogen, methane and carbon monoxide. Hydrogen gas is preferred because its use establishes equilibrium of the reaction rather rapidly. Usually, the required residence time is within 15 minutes to 1.5 hours depending on the other conditions. When other reducing gases are used, the residence time is somewhat longer and is therefore less desirable.

The pressure within the autoclave may vary widely. A range of from 50 to 1500 pounds per square inch may be used. The pressure must be adequate to prevent boiling. It should be enough to promote gas dissolution at the operating temperature. Advantageously, a good operating range is from 200 to 1200 pounds per square inch. Although higher pressures may be used, they apparently do not aid in obtaining the desired precipitate to an extent that warrants their increase in apparatus requirements and overhead. Further, where pressures of less than 50 p. s. i. g. are used, the residence time is substantially increased.

I have found that a temperature range of from 120° C. to 250° C. is successfully used. However, for best operating procedure, a range of from 190°–210° C. is preferably employed.

Active agitation of the autoclave contents during treatment is highly desirable in that it markedly reduces the necessary residence time.

The invention will be further illustrated by the following examples but is not to be construed as being limited thereto.

Example 1

A sulfur dioxide leach liquor derived from a garnierite ore, obtained by subjecting the ore to a sulfur dioxide leach treatment under pressure, filtering, heating to precipitate the major portion of magnesium as magnesium sulfite and again filtering to recover a leach liquor (more fully described in my copending application referred to above), is introduced into a suitable autoclave. The liquor contains in grams per liter (gm./l.): 0.1—copper; 1.90—nickel plus cobalt; 9.2—iron; 13.8—magnesium. This liquor is pressurized with hydrogen gas to a total pressure of about 800 pounds per square inch at 200° C. for one hour and fifteen minutes. The autoclave is cooled to room temperature and the contents therein discharged and filtered. The filtrate contains less than 0.1—Ni plus Co and 0.02 Cu in gms. per liter. The concentrated residue analyzed: 0.6% Cu, 10.6% Ni plus Co, 34.8% Fe, 27% Mg, 38.8% S. The nickel, cobalt and copper values may be separated and recovered by known techniques.

*Example 2*

A sulfur dioxide leach liquir obtained by the method of Example 1, is introduced into a suitable autoclave. The liquor contains in grams per liter: 2.6—Ni plus Co, 14—Fe, 7—Mn, and 10.5—Mg. This leach liquor is treated at 210° C. with hydrogen at a total pressure of 1000 p. s. i. g. for one-half hour. The autoclave is cooled to room temperature and the contents therein discharged and filtered. The filtrate analyzed in grams per liter: 11.2—Fe, 6.8—Mn, and 10.3—Mg. Nickel and cobalt were not found in the filtrate. The concentrated residue contained: 21% Ni plus Co, 23%—Fe, and 39%—S. The nickel and cobalt values are separated and recovered by known techniques.

I claim:

1. A method for treating a sulfur dioxide-saturated leach liquor, containing as soluble compounds thereof at least one diluent metal selected from the group consisting of iron, manganese and magnesium, and not more than 15 weight percent combined weight in metal values selected from the group consisting of nickel, cobalt and copper, to selectively concentrate said metal values, which comprises the steps of treating said leach liquor with a reducing gas under a positive overpressure at a temperature of from about 120° C. to about 250° C., whereby metal values are precipitated as insoluble sulfur compounds thereof, maintaining said temperature and pressure conditions until precipitation of metal values substantially ceases and separating resultant solids and liquid.

2. The method of claim 1 wherein the reducing gas is hydrogen.

3. A method for treating a sulfur dioxide-saturated leach liquor containing as soluble compounds thereof at least one diluent metal selected from the group consisting of iron, manganese and magnesium, and not more than 15 weight percent combined weight in metal values selected from the group consisting of nickel, cobalt and copper, to selectively concentrate said metal values, which comprises the steps of heating said liquor at a temperature of about 120° C. to about 250° C. under a positive partial pressure of reducing gas and a total pressure of from about 50 to about 1500 pounds per square inch gauge, whereby metal values are precipitated as insoluble sulfur compounds thereof, and maintaining the temperature and pressure until precipitation of metal values is substantially complete.

4. The method of claim 3 wherein the reducing gas is hydrogen.

5. A method for concentrating metal values from a sulfur dioxide-saturated leach liquor, containing iron, manganese, magnesium and a combined weight of not more than twenty grams per liter of metal values selected from the group consisting of nickel, cobalt and copper, which comprises the steps of: heating said leach liquor at a temperature of from about 190° C. to about 210° C. under a positive partial pressure of hydrogen and a total pressure of from about 200 to about 1000 pounds per square inch gauge, whereby metal values are precipitated as insoluble sulfur compounds thereof, cooling the reaction mixture, maintaining said temperature and pressure conditions until precipitation of metal values substantially ceases and separating resultant solids and liquid, and filtering said reaction mixture to recover a precipitate in which the nickel, cobalt, copper values are in higher ratio to iron, manganese and magnesium than in said liquor.

References Cited in the file of this patent

UNITED STATES PATENTS

| | | |
|---|---|---|
| 1,783,662 | Marx et al. | Dec. 2, 1930 |
| 2,694,005 | Schaufelberger | Nov. 9, 1954 |

OTHER REFERENCES

Mining Engineering, vol. 5, issue 6, pages 578–579, June 1953.